Dec. 16, 1958   H. T. BRIGHT   2,864,226
ROTARY LAWN MOWER
Filed Aug. 8, 1955
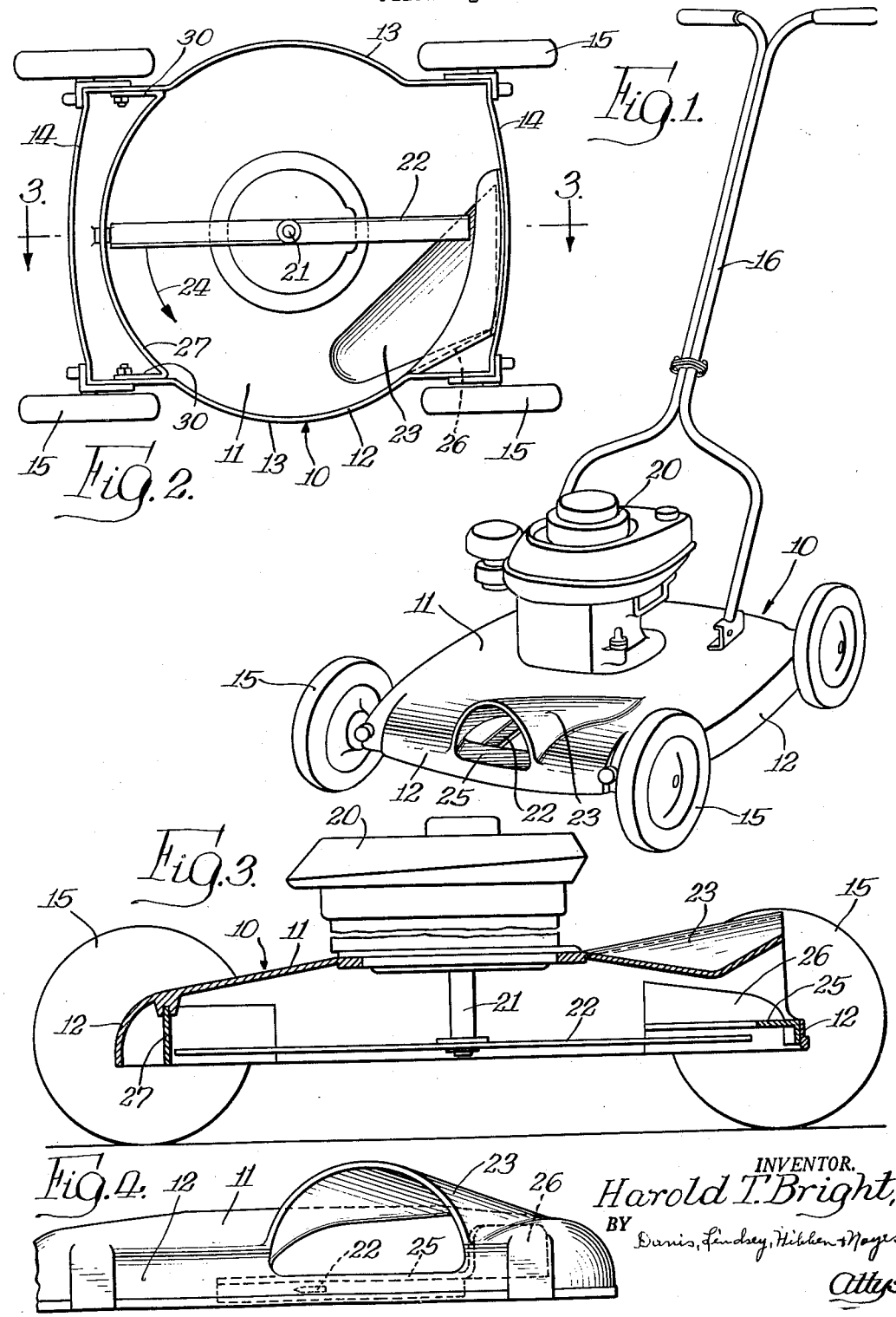
INVENTOR.
Harold T. Bright,
BY Davis, Lindsey, Hibben & Noyes
Attys.

2,864,226
Patented Dec. 16, 1958

2,864,226
ROTARY LAWN MOWER

Harold T. Bright, Elmhurst, Ill., assignor to Robertson Manufacturing Company, Chicago, Ill., a corporation of Illinois Application August 8, 1955, Serial No. 526,839

4 Claims. (Cl. 56—25.4)

The invention relates generally to lawn mowers and more particularly to a lawn mower of the type having a blade which is rotatable about a vertical axis.

The general object of the invention is to provide a novel mower of the rotary type, by which the grass cuttings are reduced to a finely divided state and are sufficiently dispersed so that the cuttings will provide a mulch for the grass without leaving unsightly bunches or streaks of cuttings on the top of the grass.

Another object is to provide a mower of this character, which is safe in operation.

Other objects and advantages will become apparent from the following description taken in connection with the accompanying drawing, in which:

Fig. 1 is a perspective view of a lawn mower embodying the features of the invention;

Fig. 2 is a bottom plan view of the lawn mower shown in Fig. 1;

Fig. 3 is an enlarged longitudinal sectional view taken on the line 3—3 of Fig. 2; and Fig. 4 is an enlarged fragmentary front elevational view of the casing of the mower.

One type of lawn mower which is in much use today is that type known as the rotary power lawn mower. In this type of mower, a downwardly opening casing is provided and the casing is supported by a plurality of wheels so that it may be manually rolled over the lawn. On top of the casing is a small prime mover such as a gasoline engine, having its drive shaft extending downwardly into the casing. On the lower end of the drive shaft there is mounted a rotary horizontal blade which cuts the grass to a uniform height as the mower is pushed over the lawn.

With this type of mower where the casing is open only on its lower side, the cuttings must of necessity be discharged downwardly and, if the grass is dry when being cut, streaks of cuttings are left on top of the cut lawn which become unsightly as they turn brown from complete drying. If the grass when being cut is at all moist, either from external dampness or from the juices therein, the cuttings will ball up in the upper part of the casing and eventually drop out in bunches which give a very unsightly appearance to the lawn unless removed after cutting. Of course some of the cuttings are fine enough to be dispersed in the lawn and form a mulch therefor but much of the grass will be left on top of the lawn in the form of such bunches. It is of course desirable to have all of the cuttings of sufficient fineness so that all of the cuttings will form the mulch for the lawn. For this reason, the cuttings should be reduced to a finely divided state and should be dispersed on the lawn and not held in the casing of the mower long enough to form such undesirable bunches. Moreover, with the casing completely closed above the blade, any pressure built up in the upper part of the casing must be dissipated downwardly through or around the blade, thus tending to bend the uncut grass downwardly and to blow away any leaves in front of the mower.

A mower embodying the features of the invention accomplishes the desired result by discharging the cuttings from the upper part of the casing before they ball up into bunches. However, the cuttings are held in the casing long enough so that some recutting thereof occurs to reduce them to a finely divided state but they are then discharged in a continuous stream so that no bunching will occur. Since the uncut grass enters the mower at the front of the machine, the discharge for the cuttings is provided at the front of the machine so that the cuttings will have traveled through substantially 360° of rotation before being discharged and they will be recut to a great extent. If the discharge opening from the casing were at either of the sides or at the rear of the casing, the cuttings would travel through only 90° or 180° or possibly 270° of rotation before being discharged and therefore would not be subjected to the extent of recutting that occurs if they were carried through 360° of rotation. The increased travel of the cuttings inside of the casing will not tend to cause any bunching since there is no stoppage of the travel of the cuttings at any point and the cuttings are freely discharged as soon as they are carried around to the front of the machine. The discharge opening, being above the blade, avoids dissipation of pressure downwardly through the area of sweep of the blade, and a low pressure area is created below the blade, which tends to hold the blades of grass in an erect position without flattening, so that a thorough job of cutting is performed.

Another advantage is attained by the forward discharge of the cuttings. Those cuttings that are fine enough to provide the desired character of mulch will immediately fall to the ground and be dispersed between the upstanding blades of grass in the path of the mower, while those cuttings which have not been reduced to a fine enough state will tend to remain on the top of the uncut grass and will again be drawn through the mower for recutting to the finer state. Thus, substantially all of the cuttings will be reduced in size to a much greater extent than if the mower discharged the cuttings sidewardly or rearwardly and a highly desirable form of mulch is thereby provided.

The interior of the casing is provided with partitions so that the cuttings are confined substantially to the area defined by the sweep of the blade. The cuttings are thus subjected to the action of the blade and cannot be thrown into relatively dead areas where no cutting action is taking place. The front discharge of the cuttings also is a safety factor, particularly as compared to a rear discharge opening, since no sticks or stones encountered by the mower can be thrown against the user. As a further protection, a safety bar may be incorporated in the casing above the blade and adjacent the front opening which will prevent accidental contact with the moving blade of anything unintentionally inserted through the front opening. This bar also functions to increase the pressure differential above and below the blade, particularly at the front of the mower.

In Fig. 1, I have shown a mower of this type, which comprises a casing, indicated generally at 10, comprising a top wall 11 and a downwardly extending side wall or skirt 12 around the perimeter of the casing. The top wall 11 may be slightly arched and curved at its outer edges so as to merge into the side wall or skirt 12. In the present instance, as shown in Fig. 2, the casing 10 is of generally rectangular form, having circular side portions 13 and end portions 14 at both its front and rear, which extend beyond the circle defining the sides. To support the casing for rolling over the lawn, wheels 15 may be mounted at the corners of the front and rear portions 14. Preferably the wheels are adjustable vertically relative to the casing 10 so as to be able to adjust the height of cutting of the grass. A swingable handle 16 may be attached to the casing 10 by which the operator can push the mower over the lawn. It will be noted in Fig. 2 of the drawing that each circular side portion 13 projects slightly beyond the outer side of the wheels so that close side trimming can be done with the mower.

Mounted on top of the casing is a prime mover which is here shown as a small internal combustion engine 20. The engine 20 is mounted with its crankshaft on a vertical axis and the shaft, shown at 21 in Fig. 3, extends downwardly into the casing. On the lower end of the shaft 21 is mounted a horizontal blade 22 which thus rotates in a horizontal plane spaced above the ground. The blade 22 is located in the lower part of the casing 10 but the side wall or skirt 12 extends slightly below the blade to provide a protection therefor. In use, as the mower is pushed or is pulled over the lawn, the high speed rotation of the blade 22 cuts the grass to an even height. This type of mower is of particular use where grasses of different height are encountered since the high speed action of the blade will sever the blades of grass regardless of their height.

The blade 22 by its rotation has a fan-like action, creating a low pressure area below the blade and a high pressure area above the blade. This tends to force the cuttings upwardly in the casing 10 and at the same time gives the cuttings a rotary motion within the casing. To discharge the cuttings from the upper part of the casing after they have rotated through substantially 360°, the casing at its front above the blade 22 is provided with an inverted chute portion 23 open at its front end above the side wall 12 and intermediate the sides. The chute 23 emerges at that side of the casing where the cuttings are moving forwardly during their rotary motion and extends to the front of the casing. With the chute open at its front end, the cuttings are thereby discharged directly into the path of the mower. In the present instance, as shown by the arrow 24 in Fig. 2, the blade is rotated clockwise when viewed from the top and consequently the chute extends from a point adjacent the left side of the casing to the front of the casing. The chute 23 is shaped so that the cuttings will be thrown tangentially therethrough. To prevent any obstruction to free passage of the cuttings through the chute, it preferably flares both upwardly and laterally and has a semi-circular cross-sectional form. Thus, as the blade 22 rotates and forces the cuttings upwardly, such cuttings will be discharged through the chute forwardly into the path of the mower. Since the grass enters the mower at the front thereof, the cuttings will travel approximately 360° around the circle of rotation of the blade before they are discharged through the chute.

Since the fan-like action of the blade tends to create a low pressure area below the blade and a high pressure area above the blade, the opening provided by the chute 23 prevents the higher pressure being dissipated downwardly through the area of the sweep of the blade and hence maintains the low pressure condition below the blade. This avoids flattening down the uncut grass and, in fact, tends to draw it upwardly. It also tends to draw leaves into the blade so that they will be well disintegrated. The front opening is particularly advantageous in this respect in that the pressure differential, above and below the blade, is accentuated adjacent the opening and, since this is at the front of the mower, the uncut grass and leaves entering the mower are drawn toward the blade.

As a further result of this construction, considerable recutting of the grass occurs so that, when the cuttings are discharged through the front end opening of the chute, they are in a finely divided state. The cuttings that are fine enough will sink into the uncut grass in the path of the mower and will form the desired mulch. However, those cuttings that are not sufficiently fine will lie on the top of the uncut grass and will pass through the mower a second time for recutting to a fine state. Thus, substantially all of the grass is reduced to a very fine mulch which desirably sinks into the grass, and no bunches of cuttings will be formed since the cuttings are continuously discharged through the chute 23. Because of the flaring form of the chute portion, the cuttings are well dispersed over the grass. The upward flare of the chute 23 directs the discharge upwardly to some extent and not directly down on the uncut grass so that no flattening occurs because of the discharge.

With the chute 23 opening forwardly, any missiles thrown by the blade, such as small stones or sticks, will be discharged forwardly away from the user so that he cannot be harmed thereby. To prevent too ready access to the blade through the chute, a horizontal safety bar or guard plate 25 is mounted in the front end of the casing slightly above the blade and extending inwardly from the lower side of the front opening of the chute. The safety bar 25 is preferably angular in cross section and has one side of the angle secured to the inner face of the adjacent portion of the side wall 12.

The bar 25 also is effective in assisting in maintaining the pressure differential above and below the blade. Thus, it provides a positive separation between the high and low pressure areas substantially at the plane of the blade adjacent the discharge opening and at the front of the mower. This accentuates the tendency to draw leaves into the mower and to carry them to the blade as well as to hold the blades of grass in an erect position for cutting.

While the casing is generally rectangular in exterior form to provide portions on which the wheels may be conveniently mounted, dead areas within the casing are avoided by means of walls or partitions therein to confine the cuttings to the area over the sweep of the blade. Thus, adjacent the chute 23, at the left front corner of the casing, a partition 26 is provided which blocks off the corner so that all the cuttings will be directed toward the opening of the chute 23. The partition 26 extends from the circular side 13 forwardly in substantial alignment with the outer side of the chute portion 23. The partition 26 may be formed as a part of the horizontal safety bar 25 and may be held in place by welding or mechanically fastening it to or casting it as part of the interior of the casing. Similarly the rear portion of the casing is blocked off so that the cuttings are prevented from moving outside of the sweep of the blade. To this end, an arcuate vertical wall or partition 27 is provided in the rear portion of the casing and is secured to the casing. Thus, it may be formed integral with the casing or have bent ends 30 lying flatwise against the side of the casing and held in place by the means supporting the rear wheels 15. The cuttings thrown upwardly by the blade will thus be confined to the area above the sweep of the blade until they reach the chute portion 23 and then will be guided forwardly to the front opening of the chute.

I claim:

1. In a rotary lawn mower of the type including a downwardly opening, wheel-supported casing having a top wall and a depending side wall extending around the front, rear, and sides of the casing, a motor supported on the casing and having a drive shaft extending downwardly through the top wall into the casing, and a cutting blade mounted on said shaft in the lower part of said casing for rotation in a generally horizontal plane and having a fan-like action for drawing grass or leaves upwardly and forcing the cuttings into the upper part of the casing, the improvement comprising an inverted chute portion in said top wall having an arcuate cross-section and extending from a point adjacent one side of the casing to the front thereof in generally tangential relation to the path of rotation of the blade at the side where the blade is moving forwardly, said chute flaring both upwardly and laterally toward the front of the casing and terminating in a discharge opening located substantially above the side wall at the front of the casing for discharging cuttings upwardly and forwardly into the path of movement of the mower, and a horizontal plate portion disposed at substantially the juncture between the top wall and the side wall of the casing at the front thereof, said plate portion extending inwardly of the casing from the side wall and transversely across said chute at the lower edge of said discharge opening.

2. The structure of claim 1 further characterized in that said horizontal plate portion is disposed above the blade to provide a guard at said discharge opening.

3. In a rotary lawn mower of the type including a downwardly opening, wheel-supported casing having a top wall and a depending side wall extending around the front, rear, and sides of the casing, the casing being generally circular at its sides, a motor supported on the casing and having a drive shaft extending downwardly through the top wall into the casing, and a cutting blade mounted on said shaft in concentric relation with the circular sides in the lower part of said casing for rotation in a generally horizontal plane and having a fan-like action for drawing grass or leaves upwardly and forcing the cuttings into the upper part of the casing, the improvement comprising an inverted chute portion in said top wall having an arcuate cross-section and extending from a point adjacent one circular side of the casing to the front thereof in generally tangential relation to the path of rotation of the blade at the side where the blade is moving forwardly, said chute flaring both upwardly and laterally toward the front of the casing and terminating in a discharge opening located substantially above the side wall at the front of the casing for discharging cuttings upwardly and forwardly into the path of movement of the mower, a horizontal plate portion disposed at substantially the juncture between the top wall and the side wall of the casing at the front thereof, said plate portion extending inwardly of the casing from the side wall and transversely across said chute at the lower edge of said discharge opening, and a vertical wall portion inside said casing extending angularly and forwardly from said one circular side of the casing in substantial alignment with the outer side of said chute portion for guiding the cuttings to said discharge opening.

4. The structure of claim 3 further characterized in that said horizontal plate portion and said vertical wall portion comprise an integral unitary element secured to the inside of said casing.

References Cited in the file of this patent

UNITED STATES PATENTS

| | | |
|---|---|---|
| 2,486,969 | Nelson | Nov. 1, 1949 |
| 2,641,100 | Sylvester | June 9, 1953 |
| 2,675,661 | Titzer | Apr. 20, 1954 |
| 2,719,396 | Morris et al. | Oct. 4, 1955 |
| 2,760,327 | Bovee | Aug. 28, 1956 |